(12) United States Patent
Bailly et al.

(10) Patent No.: US 7,551,120 B1
(45) Date of Patent: Jun. 23, 2009

(54) METHOD AND A SYSTEM FOR FILTERING TRACKS ORIGINATING FROM SEVERAL SOURCES AND INTENDED FOR SEVERAL CLIENTS TO WHICH THEY ARE SUPPLIED

(75) Inventors: Carine Bailly, Tournefeuille (FR); Michel Subelet, Cugnaux (FR)

(73) Assignee: Thales (FR)

( * ) Notice: Subject to any disclaimer, the term of this patent is extended or adjusted under 35 U.S.C. 154(b) by 288 days.

(21) Appl. No.: 11/523,706

(22) Filed: Sep. 20, 2006

(30) Foreign Application Priority Data

Sep. 20, 2005 (FR) ................................. 05 09597

(51) Int. Cl.
*G08G 5/04* (2006.01)
(52) U.S. Cl. ....................................................... 342/40
(58) Field of Classification Search .................. 342/40, 342/36; 701/120
See application file for complete search history.

(56) References Cited

U.S. PATENT DOCUMENTS

2003/0097216 A1* 5/2003 Etnyre ......................... 342/36

2003/0154018 A1 8/2003 Lai
2004/0130479 A1 7/2004 Lo et al.

FOREIGN PATENT DOCUMENTS

FR 2891079 A1 * 3/2007

OTHER PUBLICATIONS

Abstract of FR 2 854 129A Oct. 29, 2004.
Andew D. Zetlan, Robert C Strain: "Augmenting ADS-B with Traffic Information Service-Broadcast" IEEE AES Systems Magazine, Oct. 2003.

* cited by examiner

*Primary Examiner*—Dan Pihulic
(74) *Attorney, Agent, or Firm*—Lowe Hauptman Ham & Berner, LLP

(57) ABSTRACT

The present invention concerns a method and a system for filtering tracks originating from several sources and intended for several clients to which they are supplied.

Figure 1:
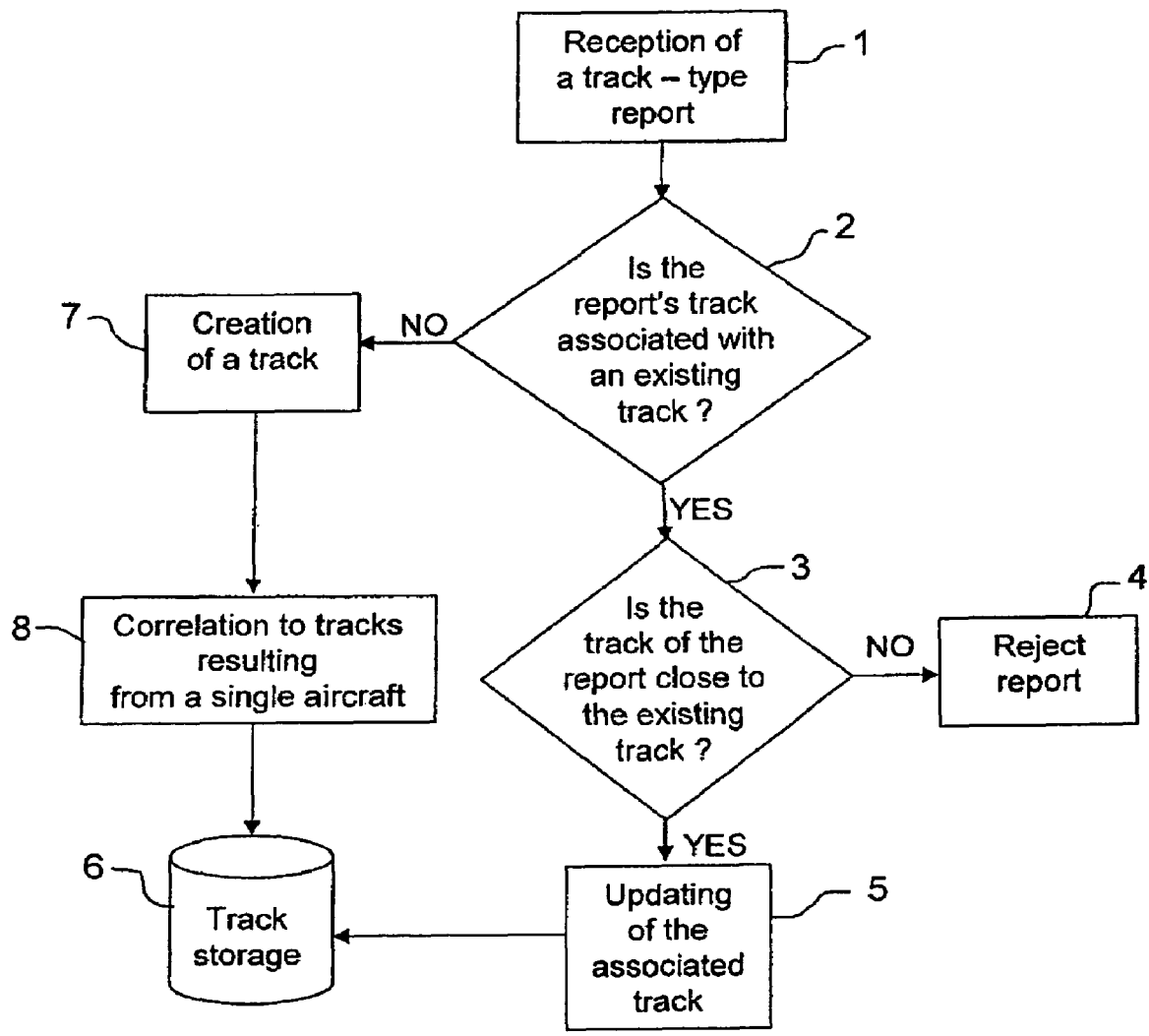

The method comprises at least a phase (8) for establishing a link between tracks resulting from a single aircraft and a phase for selecting one of the linked tracks to represent the aircraft according to a client-dependent criterion, so that a single client may not receive several distinct tracks representing the single aircraft but so that distinct clients may receive distinct tracks representing the single aircraft.

6 Claims, 2 Drawing Sheets

METHOD AND A SYSTEM FOR FILTERING TRACKS ORIGINATING FROM SEVERAL SOURCES AND INTENDED FOR SEVERAL CLIENTS TO WHICH THEY ARE SUPPLIED

The present invention concerns a method and a system for filtering tracks originating from several sources and intended for several clients to which they are supplied, a track containing information relating to an aircraft and a source characterising a type of transmitter. It applies, for example, to the field of avionics.

In addition to the voice communications between pilots and air traffic controllers, which are conducted via radio, the increasing development of world civil aviation traffic requires more and more exchanges of formatted information between the systems involved in traffic regulation.

For example, the systems exchange data known as tracks, which contain, in particular, kinematical data concerning flying aircrafts, such as position, altitude, bearing and speed. In the civil context, this kinematical data is for the most part deduced from Mode S replies transmitted by the aircrafts themselves and received by ground radars. Mode S replies contain, in particular, aircraft altitude and identifier. On the one hand, the primary radar antennas allow the determination of the successive aircraft positions, managed in a history log, allowing tracks to be deduced. On the other hand, the secondary antennas allow the received altitude and identifier to be assigned to these tracks. We will subsequently refer to the whole set of know tracks as the air picture.

New functions implemented on on-board aircraft systems, such as the Airborne Separation Assurance System (ASAS), require on-board knowledge of the air picture. ASAS applications are intended to maintain sufficient aircraft separation, i.e., between tracks and, if appropriate, propose procedures to maintain separation or even procedures to avoid collisions. However, the air picture known to ground centres is limited by the range of radars whose location is a function of the centre's needs. This location does not necessarily fulfil the needs of ASAS functions for all aircrafts. Hence, the transmission of the known air picture to aircrafts from the ground is not an appropriate solution.

To attempt to resolve this problem, a totally different strategy for the creation of tracks is being implemented, which aims to dispense with the need for ground radars. The first step is to equip aircrafts with a Global Positioning System (GPS), a positioning system based on satellite triangulation. It allows aircrafts to determine their position and altitude very precisely. The history of positions allows very easy deduction of bearing and speed, and to therefore generate their own track themselves. This track is then transmitted to other aircrafts via a new system known as Automatic Dependent Surveillance Broadcast (ADS-B). Aircrafts are equipped with an ADS-B transmitter system to transmit their own track report and an ADS-B receiver system to receive track reports from other aircrafts, at a rate of approximately one per second. These track-type reports are called ADS-B tracks by extension. Aircrafts equipped with an ADS-B transmission and ADS-B reception system have full knowledge of the air picture within the area of coverage of their ADS-B system. Of course, this holds only for the case where all aircrafts are equipped with such ADS-B systems.

But this cannot be implemented immediately, given that the current aircraft fleet is not yet equipped with ADS-B, a transitional period must be envisaged. Over this period, aircrafts not equipped with ADS-B can be tracked due to the ability of ADS-B receivers to also receive other track-type reports broadcasted by ground centres to airborne aircrafts via a system called Traffic Information Service in Broadcast mode (TIS-B). This system allows the transmission of reports of various types, including track-type reports, called TIS-B tracks by extension. TIS-B tracks are sent at a rate of about one per second. The position of a TIS-B track is no longer measured by the GPS, but by the ground radars. All aircrafts equipped with and ADS-B receiver system and within range of a TIS-B ground transmission system will receive TIS-B tracks.

However, during the transitional period, it should be noted that aircrafts equipped with ADS-B will have incomplete knowledge of the air picture. In effect, an aircraft not equipped with ADS-B that is not within range of a ground radar cannot be tracked. But the on-board knowledge of the air picture is nevertheless more complete than when no aircraft are fitted with ADS-B.

Hence, during the transitional period, certain aircrafts have access to tracks originating from TIS-B reports and tracks originating from ADS-B reports. This situation is a potential source of problems. In effect, a ADS-B track and a TIS-B track can result from the same aircraft, which is not at all easy to identify. They are of different origin and therefore often comprise different aircraft identifiers. They will always have differing positions as measured by different systems, i.e., a primary radar antenna and GPS. Not only is it possible that a single aircraft be known by two tracks, but it is also feasible that more than one TIS-B report be sent for the same aircraft by distinct ground stations, depending on the coverage of the TIS-B centres. Hence, a single aircraft may be tracked by three tracks or more. This is why in the rest of the document, we state that a track can be known from several sources, a source characterizing either one of the TIS-B sources or the sole ADS-B track source. In the rest of the document, we will refer to this as a multiple track.

Although we may foresee that a pilot will suspect that these multiple tracks originate from the same aircraft due to their excessive spatial proximity, the applications that make use of these tracks cannot make this analysis. This is typically the case for ASAS applications. Schematically, they trigger an alarm when two tracks are too close. Consequently, they cannot work on the basis of multiple tracks for a given aircraft, as these tracks are of course always too close and will therefore be systematically interpreted as distinct aircrafts that are at risk of colliding. The ASAS applications will trigger alerts and propose inappropriate avoidance procedures. But even without considering the specific case of ASAS applications, the existence of several representations for a single aircraft is not an acceptable situation, even for a visualisation application.

The transitional period therefore represents a real problem with regard to the integrity of the air picture known on board aircrafts equipped with ADS-B. Some applications are already being used, in particular applications related to in-flight safety, are not able to fulfil their functions under sufficient conditions of reliability.

One solution could be to supply a given application with tracks always originating from the same source, TIS-B or ADS-B. In effect, if only those tracks originating from the same source are considered, there will be no multiple tracks for a given aircraft. And, at worst, the air picture supplied to an application originates from a single TIS-B source. This solution is acceptable but it is a pity not to take advantage of ADS-B, which is more complete and precise as based on GPS.

The invention has the goal, in particular, of minimising the drawbacks cited above by supplying applications with an air picture that is as complete as possible with the most pertinent tracks, independently of their source of origin. To this end, the invention relates to a filtering of tracks originating from several sources and intended for several clients to which they will be provided. It comprises at least one phase for establishing a link between the tracks resulting from a single aircraft and a phase for selecting one of the linked tracks to represent the aircraft according to a client-dependent criterion, so that a single client may not receive several distinct tracks representing the single aircraft but so that distinct clients may receive distinct tracks representing the single aircraft.

Advantageously, the link between the tracks resulting from the single aircraft can be established if the tracks share a same aircraft identifier or if the distance between the tracks is below a separation threshold.

Also advantageously, for one of the clients, the track selected from amongst the linked tracks representing the aircraft, may be the track of better quality, for which the probability of being closest to the actual position of the aircraft is the highest.

For example, amongst the available track sources, there may be an ADS-B source or a TIS-B source.

For one of the clients, the track selected amongst the linked tracks representing the aircraft, can be selected according to an order of preference with regard to the source.

One of the principal advantages of the invention is that it allows the air picture to be adapted to the needs of the applications. It is therefore possible to simultaneously supply two distinct applications with different tracks for the same aircraft. For example, an application is exclusively supplied by one source and another application receives only the tracks of best available quality, regardless of their source.

Figure 2:
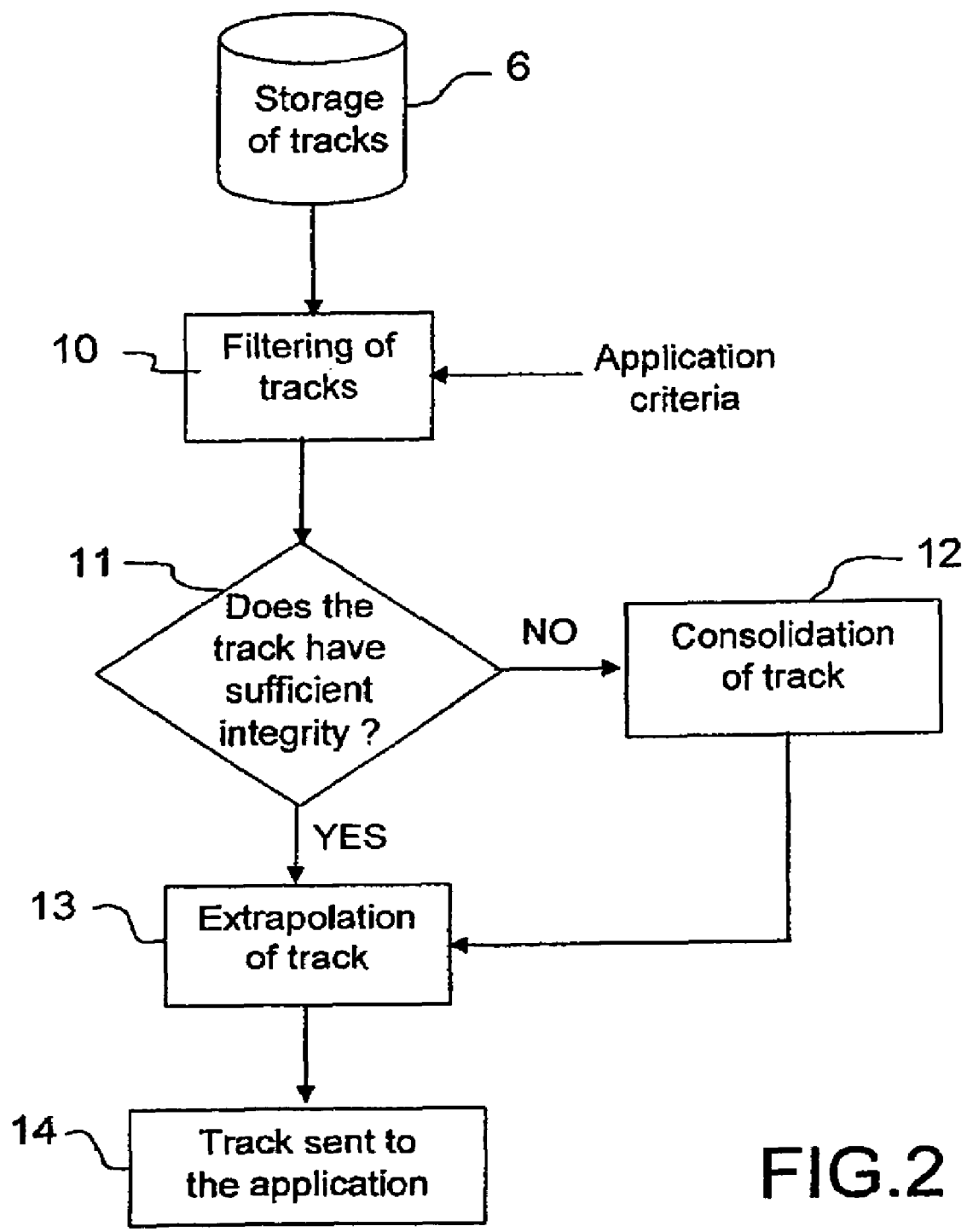

Other characteristics and advantages of the invention will be shown through the following description with regard to annexed drawings that represent:

FIG. 1, by a diagram giving an example of successive steps accomplishing the first phase of the method according to the invention, i.e., establishing a link between the tracks resulting from the same aircraft but originating from an ADS-B source and several TIS-B sources, FIG. 2, by a diagram giving an example of successive steps accomplishing the second phase of the method according to the invention for a given client, i.e., selection of one of the linked tracks to represent the aircraft based on a quality criterion.

FIG. 1 illustrates using a diagram an example of successive steps accomplishing the first phase of the method according to the invention, i.e., establishing a link between the tracks resulting from the same aircraft but originating from an ADS-B source and several TIS-B sources.

Step 1 represents the reception of a track-type report from an ADS-B or TIS-B source, this source being recognized on reception of the report.

Firstly, a test is performed at step 2 to determine if the track contained in the report has already been received from the same source. If the track contains an aircraft identifier that is already used for a track originating from the same source, then it is probable that this track is already known. This identifier can be for example a code assigned by the International Civil Aviation Organization (ICAO), a radio call sign or a response code to Mode A interrogation for tracks originating from a TIS-B source.

Advantageously, if a track that is already known from the same source does contain an identical aircraft identifier, then a confirmation test is performed at step 3. In effect, it often occurs that erroneous aircraft identifiers are transmitted in TIS-B and ADS-B track-type reports. This consists of, for example, verifying that two tracks from the same source with the same identifier are not separated by a too great distance. It is a geographical proximity test. Both tracks are first extrapolated at the current time based on position, bearing, speed and date they contain, to estimate the instantaneous position of the aircrafts from which they originate. The distance between the two extrapolated positions thus obtained is compared with a separation threshold.

If the received track is separated from the track already known sharing the same aircraft identifier(s) of more than the separation threshold, then the received track is definitely excluded in step 4, as it is unusable. This is typically the case for a received track that contains an erroneous aircraft identifier.

If the received track is separated from the track already known sharing the same aircraft identifier(s) of less than the separation threshold, then both tracks are considered to originate from the same aircraft. Hence, in step 5, the track already known is updated with the data contained in the received track. The updating of kinematical data is achieved using a Kalman filter, which allows the deduction of a new position and speed based on the kinematical data from both tracks. This updated track is stored in an adequate apparatus 6, of the type of a database or a random access memory, for example.

If at the end of step 2 it is found that no known track originating from the same ADS-B or TIS-B source shares a same aircraft identifier with the received track, then a track is created at step 7 for the source in question. Consequently, there may be several tracks for a single aircraft, for example one track for each source.

It is the purpose of step 8 to correlate the tracks resulting from the single aircraft but originating from different sources. In a first instance, this means searching for a track containing the same aircraft identifier among the other sources, such as an ICAO code, a radio call sign or a response code to a Mode A interrogation. All pairs of tracks consisting of the received track coupled with a track originating from another source, are examined pair by pair. If no track originating from another source is found using this method, then in a second instance the search is performed by a geographical proximity test, also in this case for all pairs of tracks consisting of the received track coupled with a track originating from another source. The goal is to check if the two tracks in question are spatially very close. The two tracks are firstly extrapolated to the current time based on the position, bearing, speed and date they contain to estimate the instantaneous position of the aircrafts from which they originate. The distance between the two extrapolated positions thus obtained is compared with a separation threshold. The threshold used depends on the precision of the radars and of the GPS, it is of the order of ½ nautical mile.

If the distance calculated between the two tracks is below the threshold, then the two tracks are considered to result from the same aircraft and a link is established between these two tracks. For example, this link may be the attribution of a same track identifier in the system. The other known tracks originating from the same source are not examined for correlation with the received track. Other known tracks originating from other sources are examined next. Correlation based on the aircraft identifier criteria and on the proximity criteria are examples amongst others.

If the separation between the two tracks is greater than the threshold, then the two tracks are considered to result from different aircrafts and cannot be linked. It is the next known track from the same source that is examined next in the same way, until a correlation is found.

At the end of step 8, it is possible that the track received and created in step 7 cannot be linked to any known track from another source. In all cases, in a batch of tracks linked at step 8, there cannot be two tracks originating from the same source.

The track received and created at step 7, and possibly linked in step 8, is then stored in the same apparatus 6 as described previously, of the type of a database or a random access memory, for example. Advantageously, such a storage apparatus could be dedicated to each source, thus making the browsing of tracks for a given source faster.

Cyclically at step 9, tracks stored in apparatus 6, which have not been updated at step 5 within a certain time, are deleted.

FIG. 2 illustrates using a diagram an example of successive steps performing the second phase of the method according to the invention for a given client, i.e., the selection based on a quality criterion of one of the linked tracks to represent the aircraft. The quality of a track is in particular defined by its precision and integrity.

The precision of a track is defined by the radius of the circle centred on the actual position of the aircraft and containing 95% of position measurements performed by the sensor. Hence, precision increases as this radius becomes smaller. In the case of ADS-B tracks, it is the GPS on-board the aircraft from which the track results that calculates this radius. In the case of TIS-B tracks, it is the radar operating system that calculates this radius for all the tracks it generates. The precision is transmitted with the ADS-B and TIS-B reports.

Track integrity is defined by a pair made up of the radius of a circle centred on the actual position of the aircraft and the probability that the position measurement is outside the circle without detection of the error by the sensor that generated the measurement. Thus, for a given radius, integrity increases as probability decreases. Similarly, for a given probability, integrity increases as radius increases. Again, in the case of ADS-B tracks, it is the GPS on-board the aircraft from which the track results that calculates this integrity. In the case of TIS-B tracks, it is the radar operating system that calculates the integrity for all the tracks it generates. Integrity is also transmitted with the ADS-B and TIS-B reports.

The example considered is the same as that presented in FIG. 1, where the client is an ASAS application in particular, to which the tracks are distributed cyclically. At each cycle, the goal is to determine for a given batch of linked tracks representing the same aircraft and stored on the storage apparatus 6 previously used, those tracks that best satisfy the needs of the ASAS application.

Step 10 allows, firstly, to select the track that will be sent to the ASAS application by comparing those tracks present in the batch and resulting from the same aircraft, each with the others, pair by pair, with regard to the application criterion/criteria. For example, the application criterion can be track quality. It may therefore advantageously involve comparing the precision of tracks and selecting the track having the smallest precision-defining radius for provision to the application. It should be noted that from a cycle to another, the track selected for provision to a given application may change. Furthermore, another application may favour a given source over others, or even for example favour sources according to an order of preference. Track quality is just an example of one filtering criterion amongst others. Additionally, the following steps are intimately linked to this quality criterion, they are not needed in most other execution modes.

Thus, step 11 allows verification that the integrity of the previously selected track is satisfactory for the application. This is accomplished by comparing the integrity of the track to an integrity threshold defined by the ASAS application. This integrity threshold is defined by a maximum integrity radius and a minimum integrity probability.

If the integrity radius of the track is smaller than the maximum integrity radius and if the track's integrity probability is greater than the minimum integrity probability, then the track has sufficient integrity to be supplied to the ASAS application as-is.

Otherwise, the track is submitted to step 12 before it may be distributed to the application. The aim of this step is to improve track integrity by consolidation of its kinematical data with those of another track acquired from a different source. For example, with the kinematical data from a track supplied by a system known as Traffic Collision Avoidance System (TCAS), which enables to know the air picture at a very short range from the aircraft and to ensure collision avoidance. It is first necessary to find a track originating from TCAS that shares the same ICAO aircraft code. If a TCAS track with the same ICAO code is found, then the kinematical data from this TCAS track are used to update the kinematical data of the track selected to be supplied to the application through the use of a Kalman filter, as already described for step 5. If no TCAS track having the same ICAO code is found, then no track is distributed to the ASAS application due to insufficient integrity and processing ends here for this batch.

Then at step 13, if the track selected to be distributed to the application has sufficient integrity or if it has been consolidated by virtue of a TCAS track, then its extrapolation to current time is calculated on the basis of its position, speed and date to estimate the instantaneous position of the aircraft it represents.

Finally, at step 14, the extrapolation at current time of the track is sent to the ASAS application. This track does satisfy the application's integrity criterion, in particular by virtue of the consolidation with the TCAS track and the extrapolation.

FIGS. 1 and 2 illustrate an example of implementation of the method according to the invention using correlation criteria such as aircraft identifiers or proximity, using filtering criteria such as track quality and addressing ASAS application clients. But other modes of implementation for the invention can be envisaged, using other correlation and filtering criteria, and addressing other types of clients.

The invention claimed is:

1. A method for filtering tracks originating from several sources and intended for several clients to which they are supplied, comprising at least:
    A phase for establishing a link between tracks resulting from a single aircraft,
    A phase for selecting one of the linked tracks to represent the aircraft according to a client-dependent criterion, so that a single client may not receive several distinct tracks representing the single aircraft but so that distinct clients may receive distinct tracks representing the single aircraft.

2. A method according to claim 1, wherein the link between the tracks resulting from the single aircraft is established if the tracks share a same aircraft identifier or if the distance between the tracks is below a separation threshold.

3. A method according to claim 1, wherein, for at least one of the clients, the track selected to represent the aircraft from amongst the linked tracks, is the track for which the probability of being the closest to the actual position of the aircraft is the highest.

4. A method for filtering tracks according to claim 1, wherein the sources include an ADS-B or a TIS-B source.

5. A method f according to claim 1, wherein, for at least one of the clients, the track selected to represent the aircraft from amongst the linked tracks, is selected according to an order of preference of the sources.

6. A system for filtering tracks originating from several sources and intended for several clients to which they are supplied according to claim 1, comprising one track storage device per source, the tracks from different sources resulting from the single aircraft being linked by the fact that they share a same track identifier and only one of them being used to represent the aircraft for a given client.

* * * * *